(12) United States Patent
Kawasaki

(10) Patent No.: US 10,547,765 B2
(45) Date of Patent: Jan. 28, 2020

(54) INFORMATION PROCESSING APPARATUS, METHOD OF CONTROLLING THE SAME, AND STORAGE MEDIUM

(71) Applicant: Canon Kabushiki Kaisha, Tokyo OT (JP)

(72) Inventor: Hiroki Kawasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/135,187

(22) Filed: Sep. 19, 2018

(65) Prior Publication Data

US 2019/0116289 A1 Apr. 18, 2019

(30) Foreign Application Priority Data

Sep. 29, 2017 (JP) ................................. 2017-190958

(51) Int. Cl.
| | |
|---|---|
| *H04N 1/44* | (2006.01) |
| *H04W 76/14* | (2018.01) |
| *H04N 1/333* | (2006.01) |
| *H04N 1/327* | (2006.01) |
| *H04N 1/00* | (2006.01) |
| *H04W 12/08* | (2009.01) |
| *H04W 12/06* | (2009.01) |
| *H04W 84/12* | (2009.01) |

(52) U.S. Cl.
CPC ....... *H04N 1/4433* (2013.01); *H04N 1/00244* (2013.01); *H04N 1/00307* (2013.01); *H04N 1/00474* (2013.01); *H04N 1/32776* (2013.01); *H04N 1/33376* (2013.01); *H04W 12/06* (2013.01); *H04W 12/08* (2013.01); *H04W 76/14* (2018.02); *H04N 2201/0075* (2013.01); *H04N 2201/0094* (2013.01); *H04W 84/12* (2013.01)

(58) Field of Classification Search
CPC ............. H04N 1/4433; H04N 1/00244; H04N 1/00474; H04N 1/00307; H04N 1/32776; H04N 1/33376; H04N 2201/0094; H04N 2201/0075; H04W 76/14; H04W 84/12
See application file for complete search history.

(56) References Cited

U.S. PATENT DOCUMENTS

| | | | |
|---|---|---|---|
| 2013/0057897 A1* | 3/2013 | Park ....................... | G06F 21/608 358/1.14 |
| 2015/0317115 A1* | 11/2015 | Asai ........................ | G06F 3/1236 358/1.15 |
| 2017/0134609 A1* | 5/2017 | Park .................... | H04N 1/00278 |

FOREIGN PATENT DOCUMENTS

JP 2013205982 A 10/2013

* cited by examiner

*Primary Examiner* — Neil R McLean
(74) *Attorney, Agent, or Firm* — Venable LLP

(57) ABSTRACT

An information processing apparatus capable of a wireless LAN connection with a mobile terminal, wherein, when the information processing apparatus, in a state being caused to shift to a state being capable of accepting a Wi-Fi Direct connection request from the mobile terminal, receives the Wi-Fi Direct connection request from the mobile terminal, whether or not an authenticated user has logged in to the information processing apparatus is determined, and, in a case that it is determined that an authenticated user has logged in to the information processing apparatus, Wi-Fi Direct connection processing with the mobile terminal is started.

10 Claims, 11 Drawing Sheets

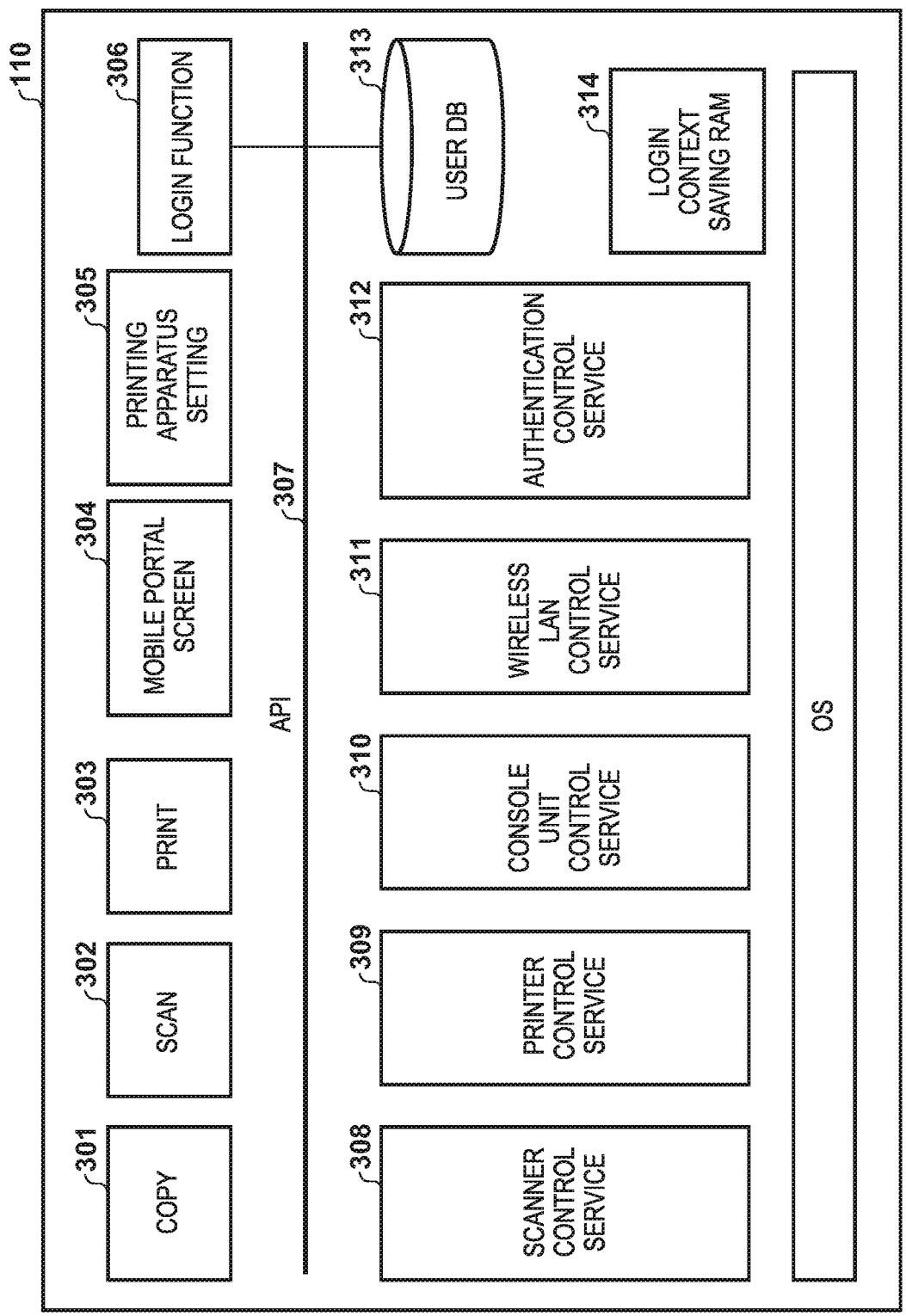

| USER ACCOUNT REGISTRATION SCREEN |
|---|

USER INFORMATION

USER NAME:          Alice
PASSWORD:           1234

AUTHORITY INFORMATION

PRINTING:                    PERMIT
COLOR PRINTING:              ONLY MONOCHROME PRINTING POSSIBLE
PRINTING METHOD:             ONLY DOUBLE SIDED PRINTING POSSIBLE
MOBILE PORTAL SCREEN:        PERMIT
                                ⋮

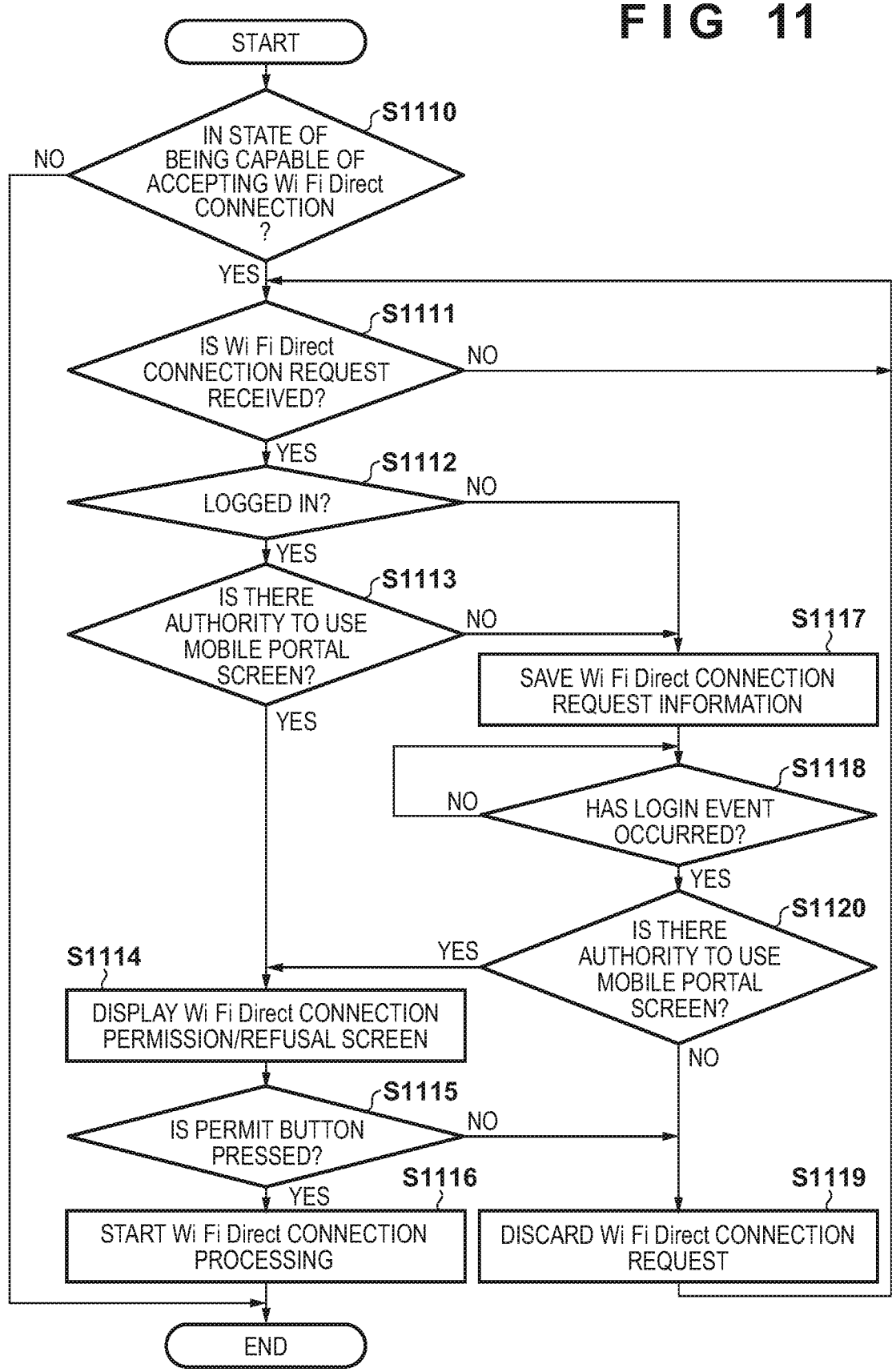

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

In recent years, increasing numbers of printing apparatuses such as multi-function peripherals and printers are provided with a wireless LAN function. A printing apparatus provided with a wireless LAN function can receive print data from an external apparatus such as a PC or a mobile terminal via an access point, and execute print processing based on the received print data.

In addition, there are printing apparatuses that perform direct wireless communication with an external apparatus without going through a relay apparatus such as an access point. Japanese Patent Laid-Open No. 2013-205982 recites a printing apparatus that performs direct wireless communication with a mobile terminal by using Wi-Fi Direct.

In the case of a direct wireless communication method, a user first enters a start state by selecting, for example, a Wi-Fi Direct start button from an operation panel of the printing apparatus. Next, the user selects, for example, a connect button of an operation panel of a mobile terminal to transmit a Wi-Fi Direct connection request from the mobile terminal to the printing apparatus. The printing apparatus, having received the connection request, displays, on a UI screen that the printing apparatus is equipped with, a confirmation screen for the user to confirm whether to permit a connection for the connection request from the mobile terminal. When approval from the user is obtained via this confirmation screen, communication in accordance with a Wi-Fi Direct connection becomes possible between the printing apparatus and the mobile terminal. For the printing apparatus, because it is unclear when the connection request from the mobile terminal is sent, it is typical that the confirmation screen is subject to a pop-up display on a console unit of the printing apparatus, so that a connection could be authorized regardless of what kind of operation the printing apparatus is performing.

In contrast, because it is typical for many users to use a printing apparatus, it is not uncommon for the printing apparatus to be equipped with a user authentication function so that a third party who does not have authority to use the printing apparatus cannot use the printing apparatus. In such printing apparatus, a login screen for allowing the input of a user name and a password is displayed on the operation unit of the printing apparatus.

With respect to the printing apparatus described above, for example, when a third party who does not have the authority to use the printing apparatus transmits a Wi-Fi Direct connection request from their own mobile terminal, the confirmation screen previously described is subject to a pop-up display on the login screen. There is a possibility that, when the third party selects "permit" on the confirmation screen, the third party's mobile terminal and the printing apparatus enter a Wi-Fi Direct connection, and the resources of the printing apparatus are threatened.

SUMMARY OF THE INVENTION

An aspect of the present invention is to eliminate the above-mentioned problem with conventional technology.

A feature of the present invention is to provide a technique that can prevent a user who is unable to log in to an information processing apparatus from connecting to the information processing apparatus by a Wi-Fi Direct connection.

According to a first aspect of the present invention, there is provided an information processing apparatus operable to make a wireless LAN connection with a mobile terminal, the information processing apparatus comprising: a memory device that stores a set of instructions; and at least one processor that executes the instructions stored in the memory to: authenticate a user; cause the information processing apparatus to shift to a state in which a Wi-Fi Direct connection request is able to be accepted from the mobile terminal; determine whether or not the authenticated user is logged in to the information processing apparatus when the Wi-Fi Direct connection request is received from the mobile terminal in the state where the Wi-Fi Direct connection request is able to be accepted; and start Wi-Fi Direct connection processing with the mobile terminal in a case that it is determined that the authenticated user is logged in to the information processing apparatus.

According to a second aspect of the present invention, there is provided a method of controlling an information processing apparatus operable to make a wireless LAN connection with a mobile terminal, the method comprising: authenticating a user; causing the information processing apparatus to shift to a state in which a Wi-Fi Direct connection request is able to be accepted from the mobile terminal; determining whether or not an authenticated user is logged in to the information processing apparatus when the Wi-Fi Direct connection request is received from the mobile terminal in the state where the Wi-Fi Direct connection request is able to be accepted; and starting Wi-Fi Direct connection processing with the mobile terminal in a case that it is determined that the authenticated user is logged in to the information processing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a functional block diagram for describing a software configuration of the printing apparatus according to the first embodiment.

FIG. 6 depicts a view illustrating an example of a user account registration screen that is displayed on the console unit of the printing apparatus according to the first embodiment.

FIG. 11 is a flowchart for describing processing for when a printing apparatus according to the fourth embodiment receives a Wi-Fi Direct connection request from a mobile terminal.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
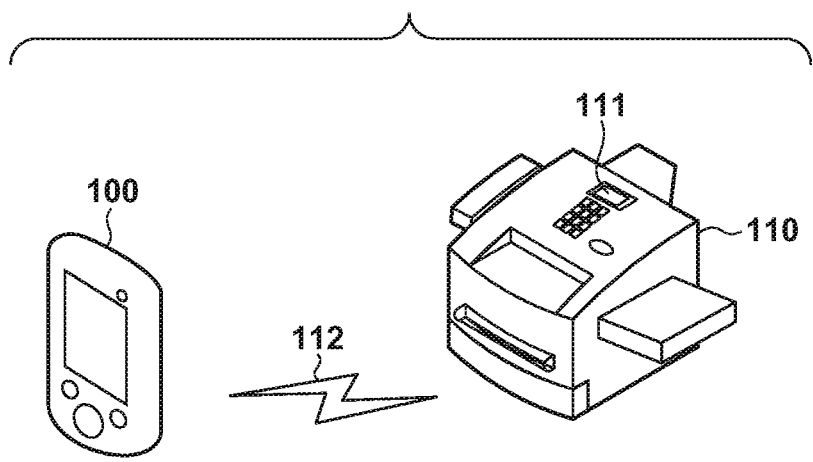
FIG. 1 depicts a view illustrating a configuration of a communication system according to a first embodiment of the present invention.

FIG. 1 depicts a view that illustrates a configuration of a communication system according to a first embodiment of the present invention.

A communication system according to the first embodiment includes a mobile terminal 100 and a printing apparatus 110 which is an example of an information processing apparatus. The printing apparatus 110 functions as an access point, and is capable of a direct wireless connection 112 for performing direct wireless communication with the mobile terminal 100 or the like. In addition, the printing apparatus 110 has a console unit 111, and it is possible to display, on the console unit 111, network information such as an authentication key, SSID, or an IP address of the printing apparatus 110.

The mobile terminal 100 can execute wireless communication such as Wi-Fi or Wi-Fi Direct. A user inputs, via a setting screen of the mobile terminal 100, the SSID and authentication key (wireless authentication information) of the printing apparatus 110 that provides the wireless direct connection 112. Accordingly, the mobile terminal 100 can connect to the wireless direct connection 112 of the printing apparatus 110. In addition, the mobile terminal 100 can transmit a Wi-Fi Direct connection request to the printing apparatus 110 by selecting an identifier that indicates the printing apparatus 110 from a Wi-Fi Direct connection screen.

Note that, in the first embodiment, although description is given of an example in which the printing apparatus 110 is a multi-function peripheral provided with a scanning function, a copy function, a facsimile function, a print function, or the like, the printing apparatus 110 is not limited to such a multi-function peripheral, and may be a printer having only a print function.

Figure 2A:
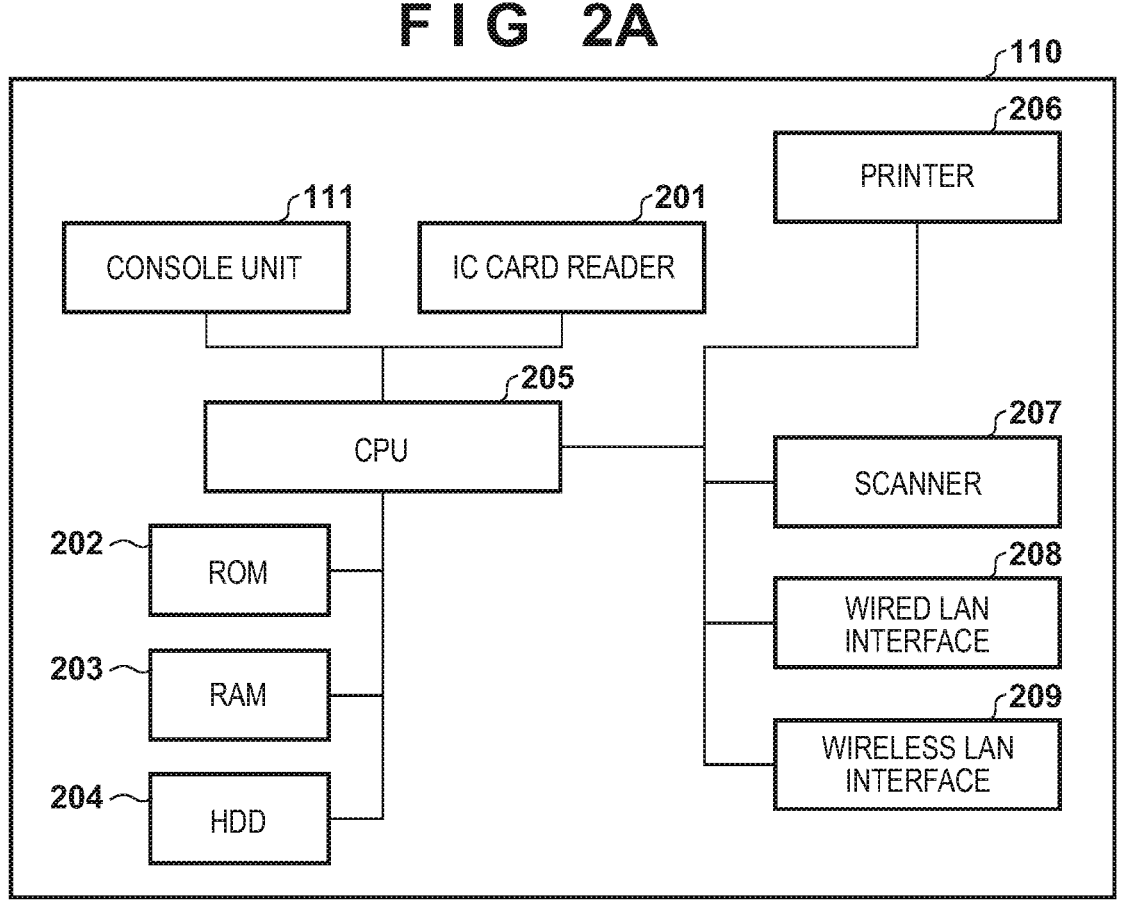
FIG. 2A is a block diagram for describing a hardware configuration of a printing apparatus according to the first embodiment.
Figure 2B:
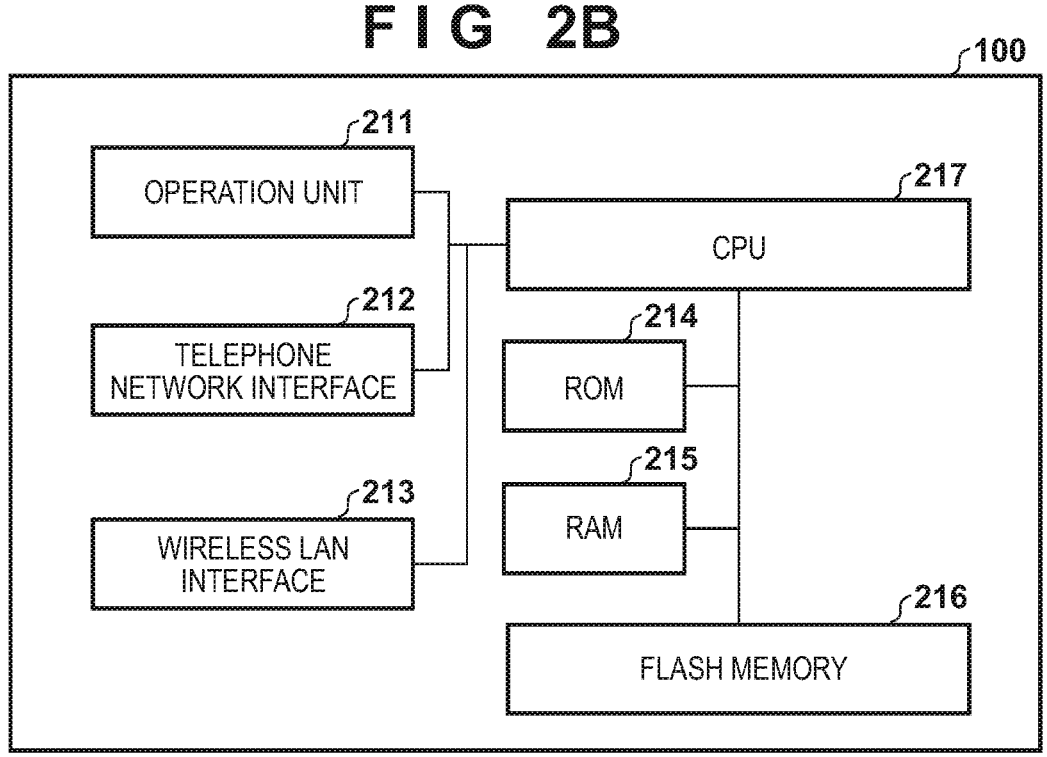
FIG. 2B is a block diagram for describing a hardware configuration of a mobile terminal according to the first embodiment.

FIGS. 2A and 2B are block diagrams for respectively describing hardware configurations of the mobile terminal 100 and the printing apparatus 110 according to the first embodiment.

FIG. 2A is a block diagram for describing a hardware configuration of the printing apparatus 110. The printing apparatus 110 is provided with an IC card reader 201 for reading a card of a user when a user logs in, a printer 206, a scanner 207, the console unit 111, and a CPU 205 which controls these. In addition, the printing apparatus 110 is provided with, as communication means, a wired LAN interface 208, and a wireless LAN interface 209. The CPU 205 executes the boot program of a ROM 202 to deploy a program stored in an HDD 204 to a RAM 203, and controls each unit described above by executing this deployed program.

The printer 206 is a printer engine for realizing a print function, and prints, onto a sheet, an image in accordance with a print job received from a mobile terminal connected to the wireless LAN access point or a PC connected to the same wired LAN network, for example. The scanner 207 optically reads a set original, and outputs a read result as image data. The wired LAN interface 208 is a network connection unit for connecting to a LAN, and is an interface that is necessary to collaborate with a PC connected to the same network. The wireless LAN interface 209 has a function as an access point for making a wireless connection with the mobile terminal 100. By this, it is possible to perform direct wireless communication with the mobile terminal 100 that is connected to the access point.

The CPU 205 can realize each function provided by the printing apparatus 110 by controlling each foregoing unit of the printing apparatus 110. The CPU 205 can send signals to various pieces of hardware via a bus line, and can also perform mutual data communication with another piece of hardware. The console unit 111 is a user interface for a user who uses the printing apparatus 110 to use the printer 206, the scanner 207, and the wireless LAN interface 209. In addition, a display unit of the console unit 111 has a touch panel function. The IC card reader 201 realizes user authentication that uses a card.

FIG. 2B is a block diagram for describing a hardware configuration of the mobile terminal 100. The mobile terminal 100 is provided with an operation unit 211 for the user to perform an operation, a telephone network interface 212, and a CPU 217 that controls these as well as a wireless LAN interface 213. The CPU 217 deploys a program stored in a ROM 214 or a flash memory 216 to a RAM 215, and executes this deployed program to thereby control each unit described above.

The telephone network interface 212 is an interface for realizing a function for mobile communication by using a telephone network. The wireless LAN interface 213 is an interface for enabling a wireless LAN connection with the printing apparatus 110.

The CPU 217 dynamically controls the pieces of hardware 211 to 216 that configure the mobile terminal 100. The CPU 217 sends signals to the various pieces of hardware via a bus line to control the telephone network interface 212 and the wireless LAN interface 213. The operation unit 211 is a user interface for a user who uses the mobile terminal 100 to use the telephone network interface 212 and the wireless LAN interface 213. In addition, a display unit of the operation unit 211 can be operated as a touch panel.

FIG. 3 is a functional block diagram for describing a software configuration of the printing apparatus 110 according to the first embodiment.

The printing apparatus 110 is provided with, as applications that operate on a platform, a copy 301, a scan 302, a print 303, a mobile portal screen 304, a printing apparatus setting 305, and a login function 306. In addition, for the applications described above, an application program interface (API) 307 communicates with various control services, and activates the applications. The various control services are a module group provided with a scanner control service 308, a printer control service 309, a console unit control service 310, a wireless LAN control service 311, and an authentication control service 312. In addition, the printing apparatus 110 is provided with a user database 313 that holds user information, and a login context saving RAM 314 for saving a login context of a user who has logged in.

The copy 301, the scan 302, the print 303, the mobile portal screen 304, and the printing apparatus setting 305 are provided with a user interface that a user can operate. The mobile portal screen 304 is a user interface for making a wireless connection between the printing apparatus 110 and the mobile terminal 100, and is capable of connecting with the mobile terminal 100 by starting-up a Wi-Fi Direct function. When the mobile portal screen 304 is activated, a list of terminals that can be connected to by using Wi-Fi Direct is displayed on the screen of the printing apparatus 110. A user starts processing for connecting with the mobile terminal 100 by selecting an identifier of the mobile terminal 100 from the list display which is displayed on the screen of the printing apparatus 110. In addition, by selecting the identifier of the printing apparatus 110 from the Wi-Fi Direct screen of the mobile terminal 100, it is possible to transmit a connection request to the printing apparatus 110 from the mobile terminal 100. After mobile print processing ends, a user ends the Wi-Fi Direct connection by pressing a Wi-Fi Direct stop button on the mobile portal screen 304. The login function 306 provides a function for logging in to the printing apparatus 110. In addition, the login function 306, by using the user database 313, performs processing for new user registration or changing user information and manages a logged-in user.

Figure 4:
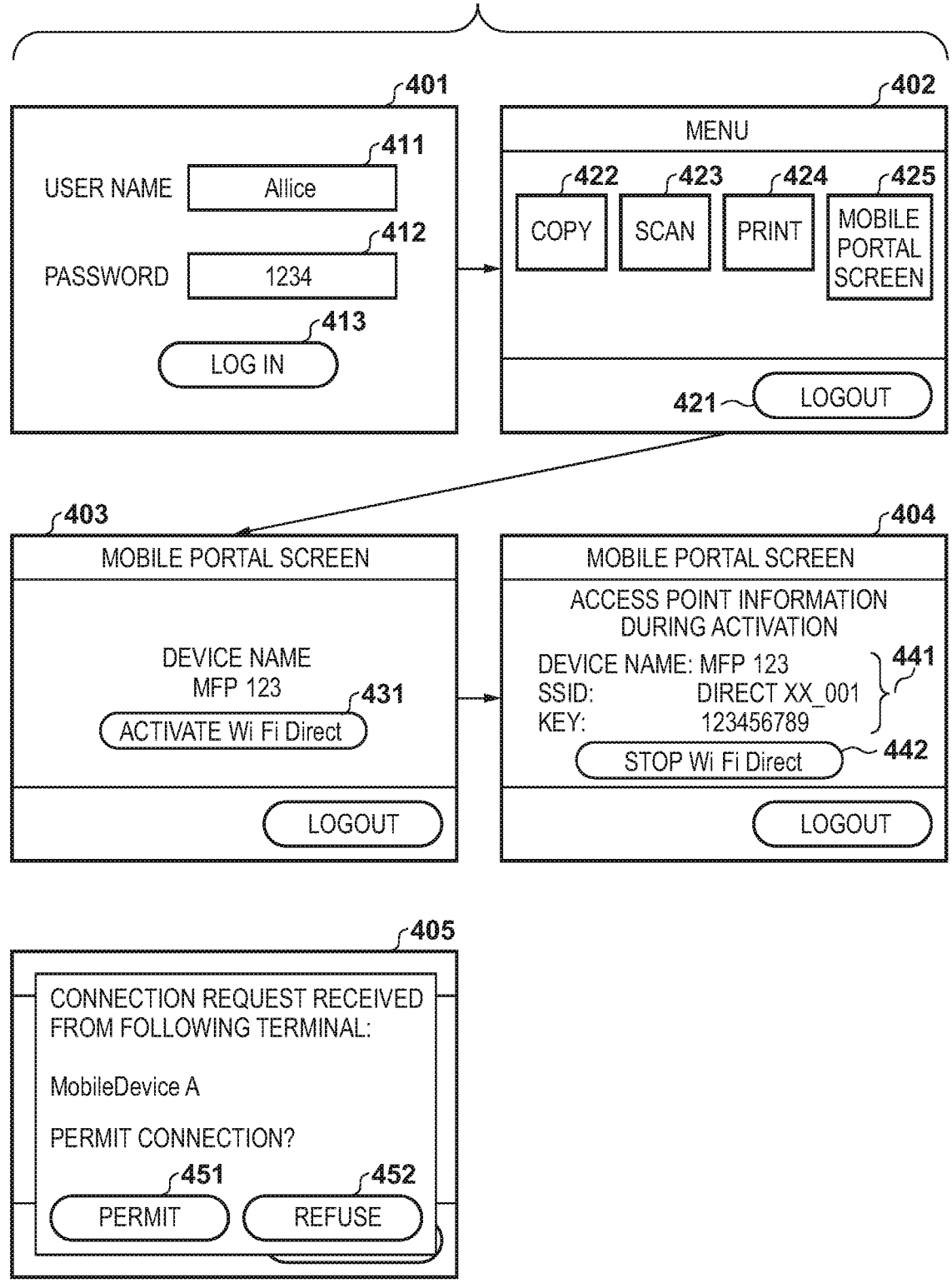
FIG. 4 depicts a view for describing transitions for screens displayed on a console unit of the printing apparatus according to the first embodiment.

FIG. 4 depicts a view for describing transitions for screens displayed on the console unit 111 of the printing apparatus 110 according to the first embodiment.

This screens include a login screen 401, a menu screen 402, and mobile portal screens 403 and 404.

In the login screen 401, user authentication is performed by the input of authentication information such as a user name 411 and a password 412 and the pressing of a login button 413, and the menu screen 402 is transitioned to when the user authentication succeeds. A mobile portal screen button 425 is present in the menu screen 402 in addition to buttons, such as a copy 422, a scan 423, and a print 424, that the printing apparatus 110 is normally provided with. The mobile portal screen 403 is transitioned to when the mobile portal screen button 425 is pressed on the menu screen 402.

The name of the device currently being used (the name (MFP-123 in FIG. 4) of the printing apparatus 110) is displayed on the mobile portal screen 403, and a Wi-Fi Direct activation button 431 for activating Wi-Fi Direct is also displayed on the mobile portal screen 403. Wi-Fi Direct is activated by a user pressing the activation button 431. At this point, the screen transitions to a mobile portal screen 404. On the mobile portal screen 404, wireless authentication information 441 for making a Wi-Fi Direct connection with the mobile terminal 100 is displayed on the screen 404, and a Wi-Fi Direct stop button 442 for performing processing for stopping Wi-Fi Direct is also displayed on the screen 404. For the wireless authentication information 441, typically a Wi-Fi Direct device name or the like is used. When the printing apparatus 110 receives a Wi-Fi Direct connection request in a state where the printing apparatus 110 has activated Wi-Fi Direct, a connection permission/refusal screen 405 is displayed. Wi-Fi Direct connection processing can be executed when a user presses a permit button 451 on the connection permission/refusal screen 405 to instruct connection authorization, and when a user presses a reject button 452, the printing apparatus 110 performs processing to refuse a connection with the displayed terminal.

The authentication function described above is something described as using a device authentication function for performing user authentication in order to use the device. In addition there are functions with no authentication or function-basis authentication, and it is possible for a user having an administrator authority to perform settings for functions.

Table 1 illustrates usage patterns for the mobile portal screen with each authentication function.

TABLE 1

|  |  | Unauthenticated | Authenticated |
|---|---|---|---|
| No authentication |  | ○ | — |
| Device authentication |  | — | ○ |
| Function-basis authentication | Authentication to mobile portal screen | — | ○ |
|  | No authentication to mobile portal screen | ○ | ○ |

In the case of no authentication, because no check is performed on a user's authority information, any user can use the wireless LAN direct function from the mobile portal screen 403. In the case of device authentication, all registered users have authority for the mobile portal screen, and if a user is authenticated, they can use the wireless LAN direct function from the mobile portal screen 403. In the case of function-basis authentication, when using a function of the printing apparatus 110, there is a registration for whether or not to perform user authentication when a user presses the mobile portal screen button 425. In the case of "authentication to mobile portal screen", the authority of an authenticated user is checked, and the mobile portal screen 403 is caused to be displayed in the case of a user to whom an authority has been granted. In the case of a user to whom an authority has not been granted, the text "you have no authority to use the mobile portal screen" is displayed. For example, as in FIG. 5, when a user presses the mobile portal screen button 425 on the menu screen 402, an authentication screen 502 is displayed, and after authentication of the user is performed in accordance with a user name 521 and a password 522, the mobile portal screen 403 is displayed when authentication is successful.

In the case of "no authentication to mobile portal screen", similarly to the case of no authentication, any user can use the wireless LAN direct function from the mobile portal screen 403.

Figure 5:
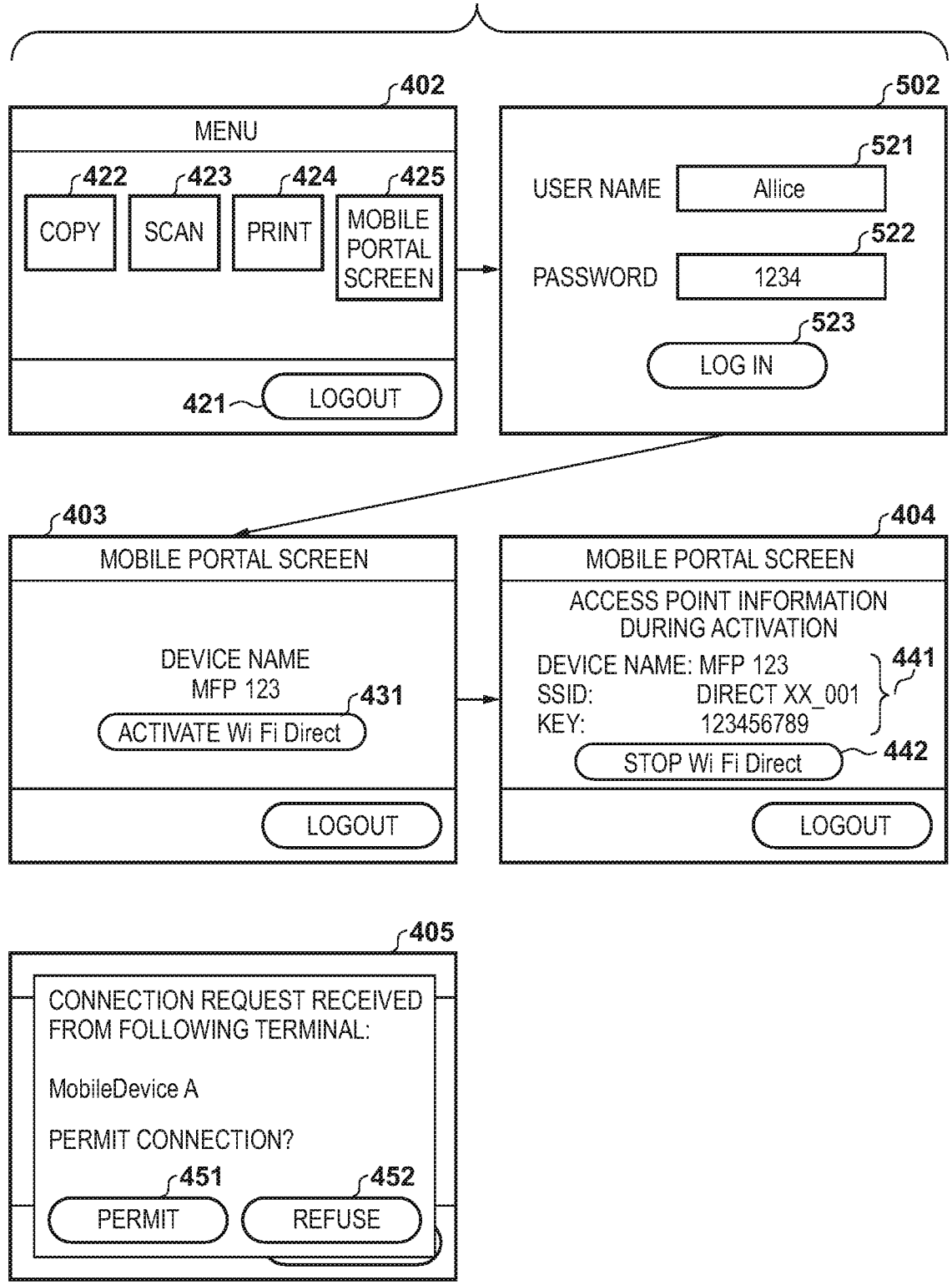
FIG. 5 depicts a view for describing screen transitions in a case where user authentication is necessary when a mobile portal screen button is selected in the printing apparatus according to the first embodiment.

FIG. 5 depicts a view for describing screen transitions in a case where user authentication is necessary when the mobile portal screen button 425 is selected in the printing apparatus 110 according to the first embodiment. Note that, in FIG. 5, the same reference numerals are added to portions in common with FIG. 4, and description thereof is omitted.

FIG. 5 illustrates the case where function-basis authentication is "authentication to mobile portal screen". When a user selects the mobile portal screen button 425 on the menu screen 402, a login screen 502 is displayed on the console unit 111. User authentication is performed by the input of authentication information such as the user name 521 and the password 522 and the pressing of a login button 523, and transition is made to the mobile portal screen 403 when the user authentication succeeds. Subsequent operations are the same as those of FIG. 4 previously described.

A login service in the printing apparatus 110 according to the first embodiment is provided with a login function and a user account management function which are described below.

A user account management function provides a user with a user interface for managing or registering user accounts. Information registered via the user interface is stored and managed in the user database 313. As information managed here, for example there is a user name, a password, an IC card number, authority information, or the like, as indicated in Table 2.

TABLE 2

| User name | Password | IC card number | Authority information |
|---|---|---|---|
| Administrator | password0 | 01a1b2c3d4e5f6g0 | Can use mobile portal screen |
| Guest | | | Cannot use mobile portal screen |
| Alice | password1 | 01a1b2c3d4e5f6g1 | Can use mobile portal screen |
| Bob | password2 | 01a1b2c3d4e5f6g2 | Can use mobile portal screen |
| Carol | password3 | 01a1b2c3d4e5f6g3 | Can use mobile portal screen |
| Dave | password4 | 01a1b2c3d4e5f6g4 | Can use mobile portal screen |

The login function provides a user whose uses the console unit 111 of the printing apparatus 110 with login and logout functions. The login screen 502 is displayed on the console unit 111, and a user who has not logged in is restricted to not be able to use an application that only a user who has logged in can use. Here, the number of users who can log in at the console unit 111 is one. Consequently, a plurality of users cannot simultaneously log in to the printing apparatus 110.

In a case where a user succeeds at logging-in, the display of the console unit 111 is caused to transition from the login screen 502 to the mobile portal screen 403 which is an application screen, and a state in which the user can use the printing apparatus 110 is entered. A plurality of login methods are provided as methods for logging in. For example, login methods as follows are provided.

(A) A software keyboard is displayed on the login screen of FIG. 4, and when a press of the login button 413 is detected, the inputted user name 411 and password 412 are obtained to perform user authentication and login processing.

(B) Login by IC card

An IC card number is obtained from an IC card that is held up to the IC card reader 201, a user is identified, and login processing is performed.

Normally, the login service authenticates a user by verifying whether a user name, password, and IC card number that the user inputted from the keyboard or the IC card matches with what is registered in the user database 313. In addition, the login service may collaborate with a server for user authentication that is connected by a wired LAN. In such a case, the user authentication is performed by verifying whether the user name, password, and IC card number obtained by the login service matches with what is registered in the server. Using an LDAP server, Windows (registered trademark) Active Directory (registered trademark), an independent server, or the like as a server for user authentication may be considered.

When a user logs in, the login service generates an object that stores information of the logged-in user, and stores the object in the RAM 203. The object that stores the information of the logged-in user is referred to below as a login context. An example of information stored in the login context is indicated in Table 3 below. Table 3 indicates an example of a login context for when a user name is "Alice".

TABLE 3

| Item | Value |
|---|---|
| User name | Alice |
| Domain name | Localhost |
| Authority information | Can use mobile connection |

A region for storing a domain name is provided in the login context so that it is possible to distinguish a user account registered in the user database 313 and a user account registered in the user authentication server as different accounts. For example, in the case where a user who is registered in the user database 313 logs in, the text sequence "localhost" is stored in the region for recording the domain name. Because the "Alice" indicated in Table 3 is registered in the user database 313 and authenticated, its domain name is "localhost".

In contrast, when there is a login by a user account that is managed by a user authentication server, a domain name or a server name is recorded as a text sequence in the region for storing the domain name. An example of information stored in the login context in a case of having logged in with a user account managed by a server is illustrated in Table 4 below. In Table 4, because "Alice" is logged in with a user account that is managed by a server, its domain name is "DomainA".

TABLE 4

| Item | Value |
|---|---|
| User name | Alice |
| Domain name | DomainA |
| Authority information | Can use mobile connection |

Note that, in a case of detecting a press of a logout button 421 of the menu screen 402 displayed on the console unit 111, the information stored in the login context (the login context saving RAM 314) is deleted, and the login screen 401 is displayed again.

Next, with reference to FIG. 6, description is given for function restriction of the printing apparatus 110.

FIG. 6 depicts a view illustrating an example of a user account registration screen that is displayed on the console unit 111 of the printing apparatus 110 according to the first embodiment.

The printing apparatus 110 according to the first embodiment is provided with a function that can set a function restriction, and by this function it is possible to put restrictions on which functions each user can use.

By a user account registration screen 601, it is possible to set authority information with respect to a user. For a user to whom an authority is set by the user account registration screen 601, a restriction is also arranged for usage of applications held by the printing apparatus 110.

In the example of FIG. 6, printing is permitted for the user "Alice", and only monochrome printing and double-sided printing are possible. Furthermore, because authority to use the mobile portal screen is "permit", usage of the functions on the mobile portal screen is possible.

As described above, authority information is present in the login context, and user authorities can be set by an administrator of the printing apparatus 110 distributing authority information for each user.

Figure 7A:
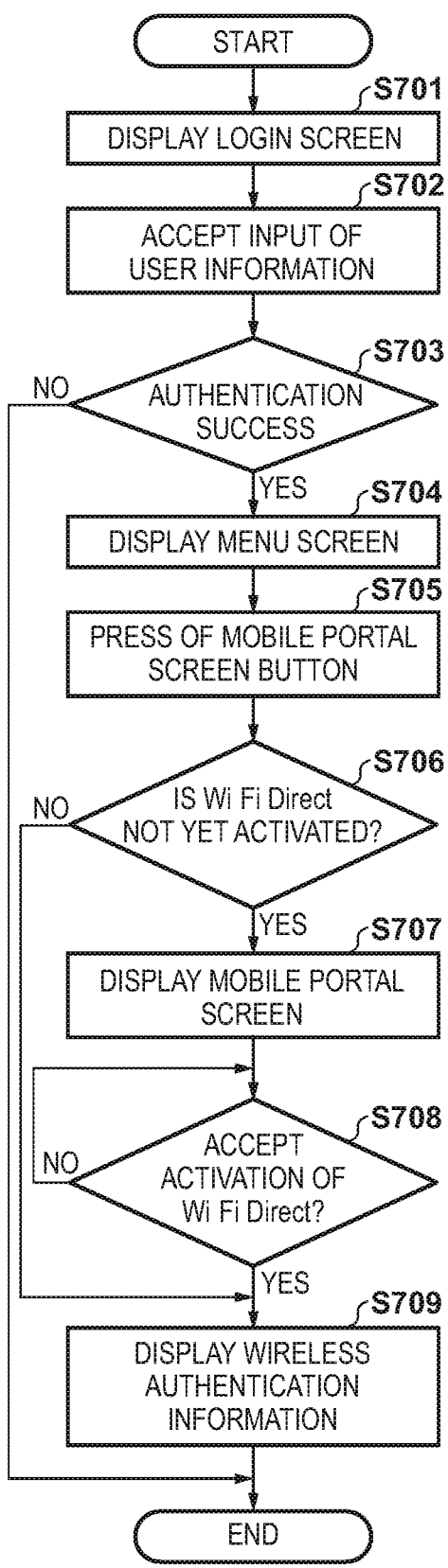
FIG. 7A is a flowchart for describing processing for displaying a mobile portal screen after a user is authenticated in the printing apparatus according to the first embodiment.
Figure 7B:
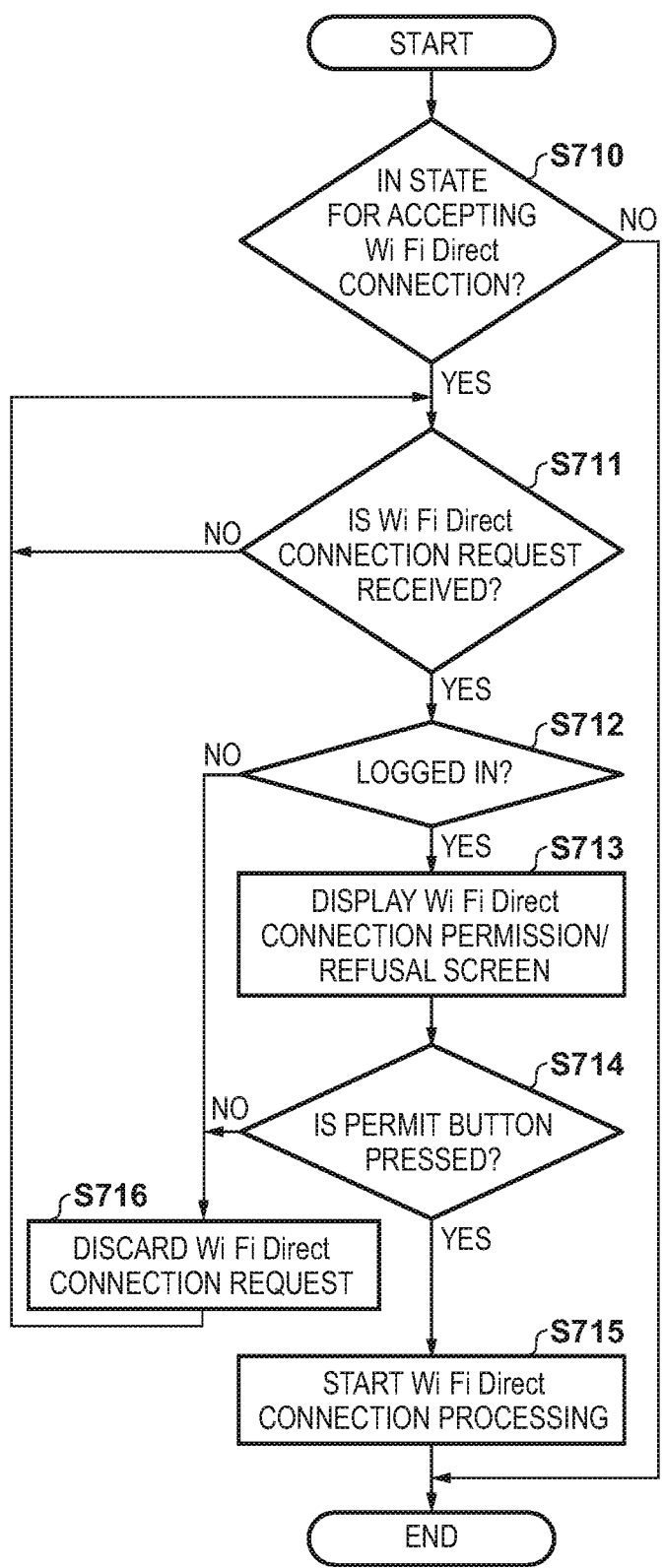
FIG. 7B is a flowchart for describing processing for when the printing apparatus receives a Wi-Fi Direct connection request from a mobile terminal.

Next, with reference to the flowchart of FIGS. 7A and 7B, description is given for the processing of the printing apparatus 110 according to the first embodiment. Note that, a device authentication function for authenticating a user based on user information registered in the user database 313 is enabled, and, in a state where a user has not logged in, the printing apparatus 110 displays the login screen 401 to request authentication of a user.

FIG. 7A is a flowchart for describing processing for displaying a mobile portal screen after a user is authenticated in the printing apparatus 110 according to the first embodiment. Note that this processing is achieved by the CPU 205 executing a program that has been deployed to the RAM 203 from the HDD 204.

Firstly, in step S701, the CPU 205 displays the login screen 401 illustrated in FIG. 4 on the console unit 111, and, in step S702, accepts input of user information (user name, password) from a user. Next the processing proceeds to step S703, and the CPU 205 authenticates the user in accordance with whether or not the user name and password inputted in step S702 are registered in the user database 313. Here, when authentication of the user succeeds the processing proceeds to step S704, but the processing ends otherwise.

In step S704, the CPU 205 displays the menu screen 402 on the console unit 111. In step S705, the CPU 205 waits for a press of the mobile portal screen button 425, and then advances the processing to step S706. In step S706, the CPU 205 determines whether or not the Wi-Fi Direct function has already been activated, and if not activated the processing proceeds to step S707 and the CPU 205 displays the mobile portal screen 403 on the console unit 111. By this, the printing apparatus 110 shifts to a state where the Wi-Fi Direct function can be used. In step S708, the CPU 205 waits for the Wi-Fi Direct activation button 431 to be pressed in the mobile portal screen 403, and then advances the processing to step S709. By this, it is possible to use the Wi-Fi Direct function of the printing apparatus 110, it is possible to accept a Wi-Fi Direct connection request from the mobile terminal 100, and the CPU 205 displays the mobile portal screen 404 on the console unit 111. The wireless authentication information 441 for making a Wi-Fi Direct connection with the mobile terminal 100 is displayed on the mobile portal screen 404. Here, a user selects, from a screen for operating the Wi-Fi Direct function of the mobile terminal 100, an identifier of the printing apparatus 110 that is displayed on the mobile portal screen 404. In this way, it is possible to transmit a Wi-Fi Direct connection request from the mobile terminal 100 to the printing apparatus 110.

FIG. 7B is a flowchart for describing processing for when the printing apparatus 110 according to the first embodiment receives a Wi-Fi Direct connection request from the mobile terminal 100. Note that this processing is achieved by the CPU 205 executing a program that has been deployed to the RAM 203 from the HDD 204.

Firstly, in step S710, the CPU 205 activates the Wi-Fi Direct function and determines whether or not it is in a state of being able to receive a Wi-Fi Direct connection request. If the CPU 205 is not in a state where the connection request can be received, this processing ends, but if it is in a state where the connection request can be received, the processing proceeds to step S711. In step S711, the CPU 205 determines whether or not the Wi-Fi Direct connection request has been received from the mobile terminal 100, and advances the processing to step S712 when the connection request is received, and otherwise returns the processing to step S711. In step S712, the CPU 205 determines whether or not the present state is a state where an authenticated user has logged in. When it is determined that an authenticated user has not logged in, the processing proceeds to step S716 and the CPU 205 discards the Wi-Fi Direct connection request received in step S711 and returns the processing to step S711.

Meanwhile, upon determining that the authenticated user has logged in in step S712, the processing proceeds to step S713, and the CPU 205 displays the Wi-Fi Direct connection permission/refusal screen 405 illustrated in FIG. 4 on the console unit 111. Note that, the Wi-Fi Direct connection permission/refusal screen 405 is displayed as popped-up on the mobile portal screen 404 in FIG. 4, but it may be displayed popped-up on the menu screen 402, for example. The processing proceeds to step S714, and when the CPU 205 determines that the permit button 451 has been pressed on the Wi-Fi Direct connection permission/refusal screen 405, the CPU 205 proceeds to step S715, and performs Wi-Fi Direct connection processing with the mobile terminal 100 that transmitted the connection request. When the CPU 205 determines in step S714 that the reject button 452 has been pressed on the Wi-Fi Direct connection permission/refusal screen 405, the CPU 205 proceeds to step S716, the Wi-Fi Direct connection request received in step S711 is discarded, and the processing returns to step S711.

By virtue of the first embodiment as described above, it is possible to prevent a user who does not have authority that enables usage of the printing apparatus 110 from using a Wi-Fi Direct function to make a Wi-Fi Direct connection to the printing apparatus.

Second Embodiment

Next, a second embodiment of the present invention will be described. In the first embodiment described above, when a Wi-Fi Direct connection request is received at a time when an authenticated user is not logged in, the Wi-Fi Direct connection request is discarded. In contrast to this, in the second embodiment, a Wi-Fi Direct connection request received at a time where there is no login is saved, and the Wi-Fi Direct connection permission/refusal screen 405 is displayed when a user next logs in. Note that, processing for activating Wi-Fi Direct in the second embodiment is the same as that in the first embodiment, and description thereof is omitted. In addition, the hardware configurations and the like of the printing apparatus 110 and the mobile terminal 100 according to the second embodiment are similar to that in the case of the first embodiment described above, and description thereof is omitted.

Figure 8:
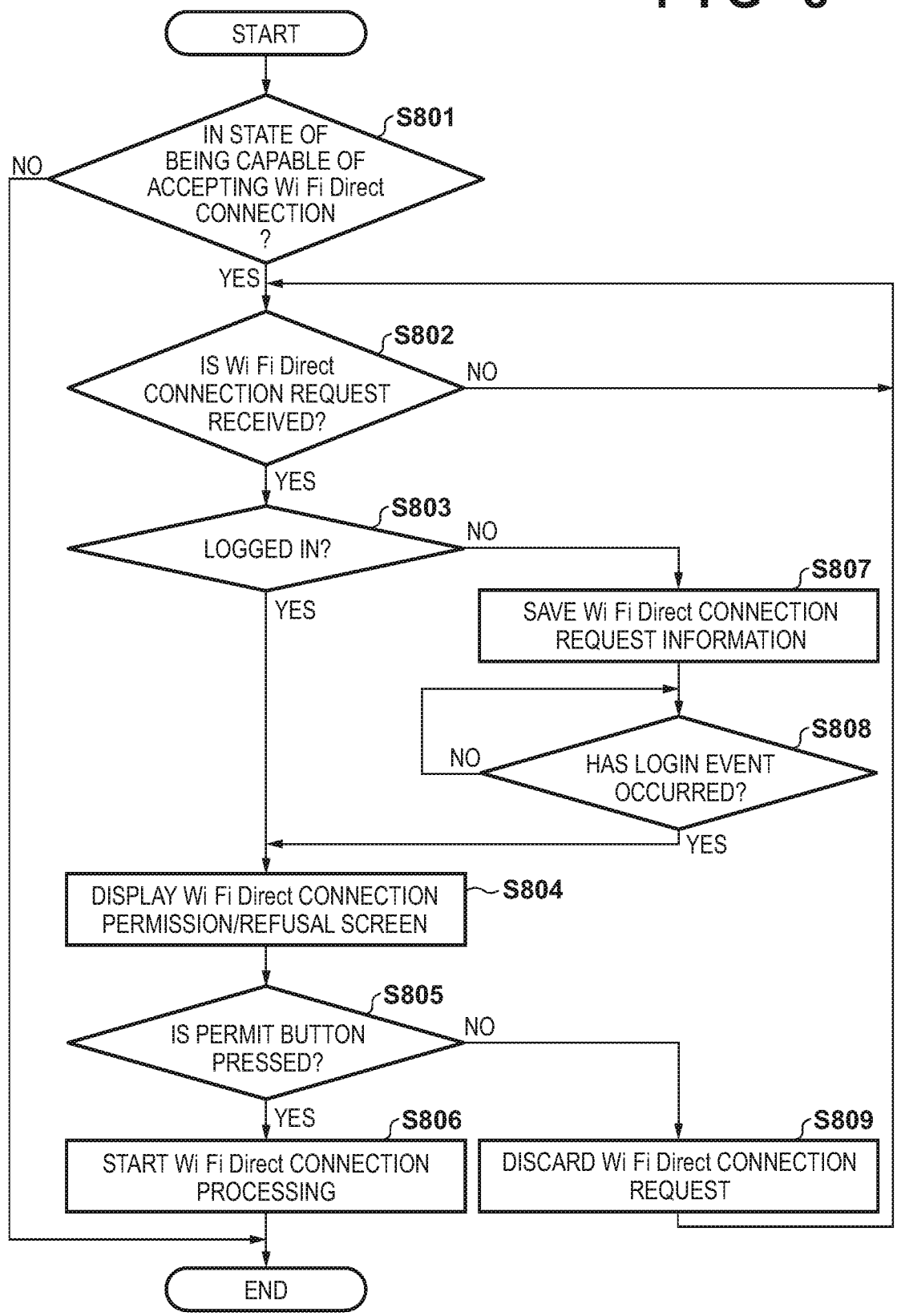
FIG. 8 is a flowchart for describing processing for when a printing apparatus according to a second embodiment receives a Wi-Fi Direct connection request from a mobile terminal.

FIG. 8 is a flowchart for describing processing for when the printing apparatus 110 according to a second embodiment receives a Wi-Fi Direct connection request from the mobile terminal 100. Note that this processing is achieved by the CPU 205 executing a program that has been deployed to the RAM 203 from the HDD 204.

Firstly, in step S801, the CPU 205 activates the Wi-Fi Direct function and determines whether or not it is in a state of being able to receive a Wi-Fi Direct connection request. When the CPU 205 determines that it is in a state where the Wi-Fi Direct connection request can be received, the processing proceeds to step S802, and otherwise the processing ends. In step S802, the CPU 205 determines whether or not it has received the Wi-Fi Direct connection request. When the CPU 205 determines that it has not received the connection request, the CPU 205 executes step S802, and when the CPU 205 has received the Wi-Fi Direct connection request, the processing proceeds to step S803. In step S803, the CPU 205 determines whether or not the present state of the printing apparatus 110 is one where an authenticated user has logged in. When the authenticated user is logged in, the processing proceeds to step S804 and the Wi-Fi Direct connection permission/refusal screen 405 is displayed, similarly to step S713 of FIG. 7B. Note that the Wi-Fi Direct connection permission/refusal screen 405 may be displayed as a pop-up on the menu screen 402. In step S805, step S806, and step S809, operations are performed as follows in accordance with a press of the permit button 451 or the reject button 452. In other words, Wi-Fi Direct connection processing with the mobile terminal 100 that transmitted connection request is performed (step S806), or the connection request or a saved connection request is discarded (step S809). Note that because this processing is the same as step S713 through step S716 of the flowchart of FIG. 7B, detailed description is omitted.

Meanwhile, when the CPU 205 determines in step S803 that the authenticated user is not logged in, the processing advances to step S807, and the CPU 205 saves information of the Wi-Fi Direct connection request received in step S802 in the RAM 203. Next, in step S808, the CPU 205 waits for a login event to occur, and, upon determining that the authenticated user has logged in, advances the processing to step S804 from step S808, and displays the Wi-Fi Direct connection permission/refusal screen 405 on the console unit 111. Processing for step S804 and thereafter is as described previously.

By virtue of the second embodiment as described above, it is possible to prevent a user who does not have authority that enables usage of the printing apparatus 110 from using a Wi-Fi Direct function to make a Wi-Fi Direct connection to the printing apparatus. In addition, after a Wi-Fi Direct connection request is made from the mobile terminal 100 in a state where an authenticated user is not logged into the printing apparatus 110, this user can make a Wi-Fi Direct connection with the printing apparatus by logging in to the printing apparatus.

Third Embodiment

Next, description will be given for a third embodiment of the present invention. In the third embodiment, description is given by an example where, in accordance with whether or not the authority information of an authenticated and logged-in user enables usage of the mobile portal function, a Wi-Fi Direct connection from a mobile terminal of the user is controlled. Note that the hardware configurations and the like of the printing apparatus 110 and the mobile terminal 100 according to the third embodiment are similar to that in the case of the first embodiment described above, and description thereof is omitted.

Figure 9:
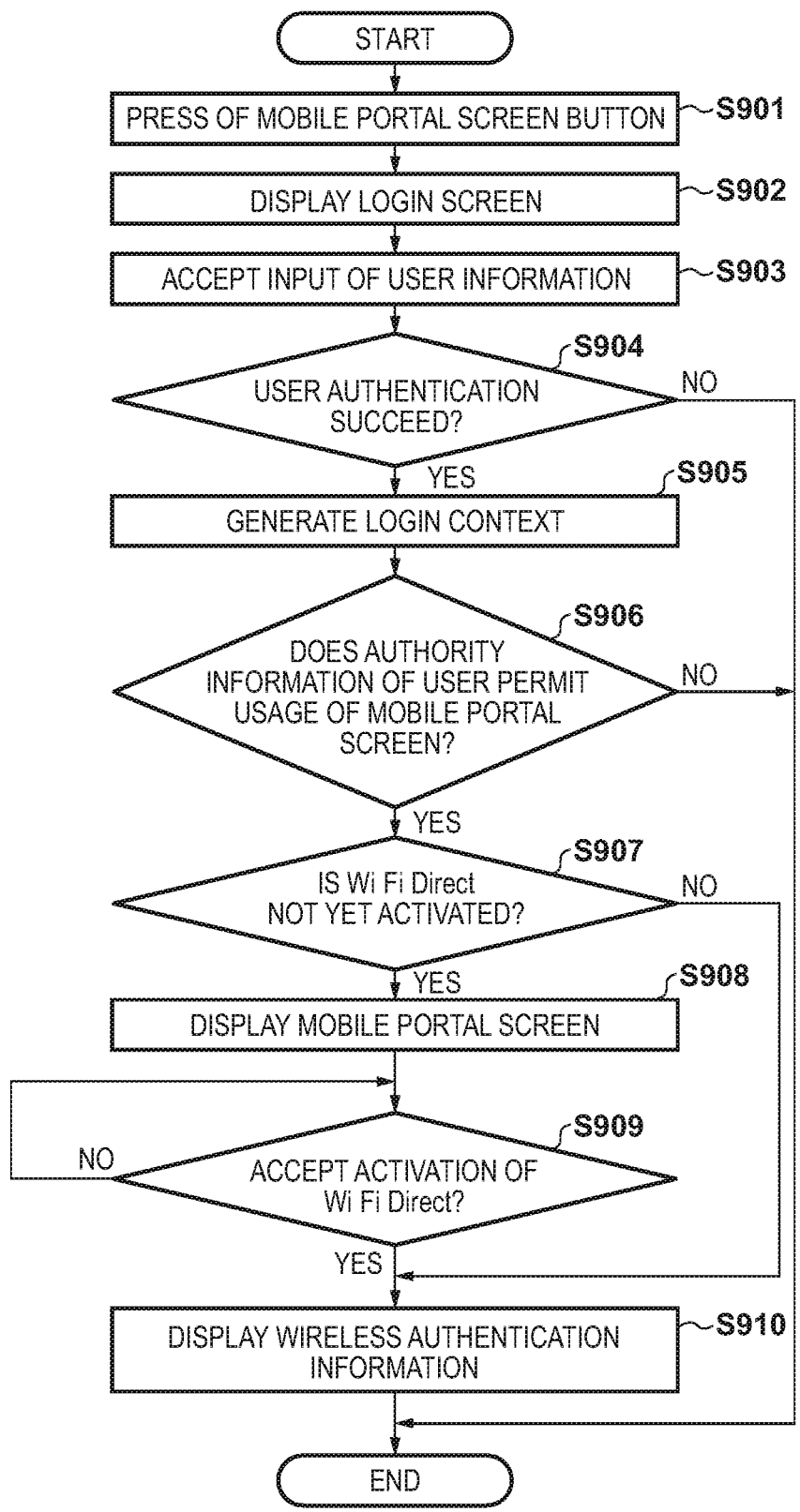
FIG. 9 is a flowchart for describing processing for displaying a mobile portal screen after a user is authenticated in the printing apparatus according to third and fourth embodiments.

FIG. 9 is a flowchart for describing processing for displaying a mobile portal screen after a user is authenticated in the printing apparatus 110 according to the third embodiment. Note that this processing is achieved by the CPU 205 executing a program that has been deployed to the RAM 203 from the HDD 204. For the printing apparatus 110, function-basis authentication function is enabled, and users who use the mobile portal screen are restricted.

Firstly, in step S901, the CPU 205, in a state where the menu screen 402 illustrated in FIG. 5 is displayed on the console unit 111, detects a press of the mobile portal screen button 425 of the menu screen 402 by a user. By this the processing proceeds to step S902, and the CPU 205 displays the login screen 502 of FIG. 5 on the console unit 111. Next, the processing proceeds to step S903, and the CPU 205 authenticates the user in accordance with whether or not user information (user name, password) from the user that is inputted via the login screen 502 is registered in the user database 313. In step S904, when authentication of the user succeeds, the processing proceeds to step S905, but the processing ends otherwise.

In step S905, the CPU 205 generates a login context which is an object that stores information of a logged-in user such as that indicated in Table 4 for example, and stores the login context in the login context saving RAM 314. Next, the processing proceeds to step S906, and the CPU 205 checks the authority information of the user who is logged in, and determines whether or not an authority to use the mobile portal screen has been granted. In step S906, the CPU 205 ends this processing when an authority to use the mobile portal screen has not been granted to the user. When the CPU 205 determines in step S906 that an authority to use the mobile portal screen has been granted to the user, the processing proceeds to step S907, and the CPU 205 determines whether or the Wi-Fi Direct function has already been activated. If the Wi-Fi Direct function has not been activated, the mobile portal screen 403 is caused to be displayed for the user (step S908). Note that the processing of step S908 through step S910 is the same as the processing of step S707 through step S709 of FIG. 7A, and thus description thereof is omitted.

Figure 10:
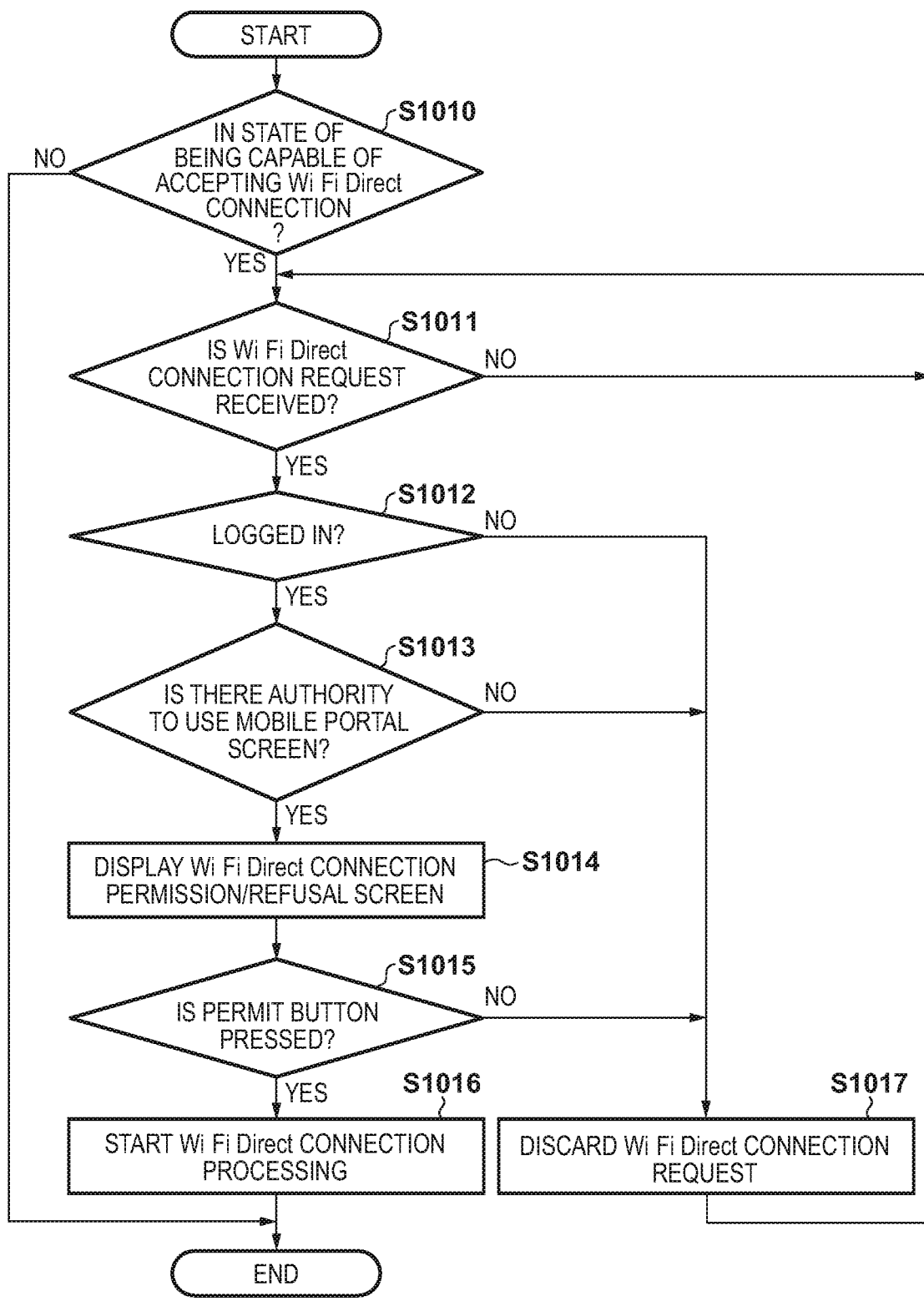
FIG. 10 is a flowchart for describing processing for when a printing apparatus according to the third embodiment receives a Wi-Fi Direct connection request from a mobile terminal.

FIG. 10 is a flowchart for describing processing for when the printing apparatus 110 according to the third embodiment receives a Wi-Fi Direct connection request from the mobile terminal 100. Note that this processing is achieved by the CPU 205 executing a program that has been deployed to the RAM 203 from the HDD 204.

Firstly, in step S1010, the CPU 205 activates the Wi-Fi Direct function and determines whether or not it is in a state of being able to receive a Wi-Fi Direct connection request. If the CPU 205 is not in a state where a connection request can be received, this processing ends, but if it is in a state where the connection request can be received, the processing proceeds to step S1011. In step S1011, the CPU 205 determines whether or not a Wi-Fi Direct connection request has been received from the mobile terminal 100, and advances the processing to step S1012 when the connection request is received, and otherwise returns the processing to step S1011. In step S1012, the CPU 205 determines whether or not the present state is a state where an authenticated user has logged in. When it is determined that an authenticated user has not logged in, the processing proceeds to step S1017 and the CPU 205 discards the Wi-Fi Direct connection request received in step S1011 and returns the processing to step S1011.

Meanwhile, when it is determined in step S1012 that the authenticated user is logged in, the processing proceeds to step S1013, and the CPU 205 checks the authority information of the logged-in user, and determines whether or not the logged-in user has authority to use the mobile portal screen. When it is determined that the user has authority to use the mobile portal screen, the processing proceeds to step S1014, otherwise the processing ends. In step S1014, the CPU 205 displays the Wi-Fi Direct connection permission/refusal screen 405 illustrated in FIG. 4 on the console unit 111. The processing then proceeds to step S1015, and when the CPU 205 determines that the permit button 451 has been pressed on the Wi-Fi Direct connection permission/refusal screen 405, the CPU 205 proceeds to step S1016, and performs Wi-Fi Direct connection processing with the mobile terminal 100 that transmitted the connection request. When the CPU 205 determines in step S1015 that the reject button 452 has been pressed on the Wi-Fi Direct connection permission/refusal screen 405, the CPU 205 proceeds to step S1017, the Wi-Fi Direct connection request received in step S1011 is discarded, and the processing returns to step S1011.

By virtue of the third embodiment as described above, it is possible to prevent a user who does not have authority that enables usage of the mobile portal screen from using a Wi-Fi Direct function to make a Wi-Fi Direct connection to a printing apparatus.

Fourth Embodiment

Next, description will be given for a fourth embodiment of the present invention. In the fourth embodiment, description is given of an example in which a Wi-Fi Direct connection request received when a user who does not have authority to use the mobile portal screen is logged in is saved, and the Wi-Fi Direct connection permission/refusal screen 405 is displayed when a login is next made. Note that, processing for activating Wi-Fi Direct according to the fourth embodiment is the same as that in the first embodiment described above, and description thereof is omitted. In addition, the hardware configurations and the like of the printing apparatus 110 and the mobile terminal 100 according to the fourth embodiment are similar to that in the case of the first embodiment described above, and description thereof is omitted.

FIG. 11 is a flowchart for describing processing for when the printing apparatus 110 according to the fourth embodiment receives a Wi-Fi Direct connection request from the mobile terminal 100. Note that this processing is achieved by the CPU 205 executing a program that has been deployed to the RAM 203 from the HDD 204. Note that the processing of step S1110 through step S1116 of FIG. 11 is the same as the processing of step S1010 through step S1016 of FIG. 10, and thus description thereof is omitted.

In step S1112, the CPU 205 determines whether or not its current state is a state where it is logged into after performing user authentication, and the processing proceeds to step S1117 when the CPU 205 determines that the authenticated user is not logged in. In step S1117, the CPU 205 saves information of the Wi-Fi Direct connection request received in step S1111 in the RAM 203. The processing proceeds to step S1118, and the CPU 205 waits for a login event to occur, and, when the CPU 205 determines in step S1118 that the authenticated user is logged in, the processing proceeds to step S1120. In step S1120, the CPU 205 examines the authority information of the logged-in user, and, upon determining that the user has authority to use the mobile portal screen, the CPU 205 advances the processing to step S1114, and displays the Wi-Fi Direct connection permission/refusal screen 405. In addition, upon determining in step S1120 that the user does not have authority to use the mobile portal screen, the CPU 205 advances the processing to step S1119, and discards the information of the Wi-Fi Direct connection request that was saved in step S1117.

By virtue of the fourth embodiment as described above, it is possible to prevent a user who does not have authority that enables usage of the mobile portal screen from using a Wi-Fi Direct function to make a Wi-Fi Direct connection to a printing apparatus.

In addition, after a Wi-Fi Direct connection request is made from a mobile terminal in a state where a user is not logged in to the printing apparatus, a transition can be made to the Wi-Fi Direct connection permission/refusal screen when a user who has authority to use the mobile portal screen logs in to the printing apparatus.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-190958, filed Sep. 29, 2017, which is hereby incorporated by reference herein in its entirety.

What is claimed is:

1. An information processing apparatus operable to make a wireless LAN connection with a mobile terminal, the information processing apparatus comprising:
 a memory device that stores a set of instructions; and
 at least one processor that executes the instructions stored in the memory to:
  authenticate a user;
  cause the information processing apparatus to shift to a state in which a Wi-Fi Direct connection request is able to be accepted from the mobile terminal;
  determine whether or not the authenticated user is logged in to the information processing apparatus in a case that the Wi-Fi Direct connection request is received from the mobile terminal in the state where the Wi-Fi Direct connection request is able to be accepted;
  start processing for establishing Wi-Fi Direct communication with the mobile terminal based on the Wi-Fi Direct connection request received from the mobile terminal in a case that at least it is determined that the authenticated user is logged in to the information processing apparatus; and
  save, in a case that it is determined that the authenticated user is not logged in to the information processing apparatus, information related to the Wi-Fi Direct connection request received from the mobile terminal.

2. The information processing apparatus according to claim 1, further comprising a storage unit configured to register user information,
 wherein, in the authentication of the user, the at least one processor executes the instructions to authenticate the user based on the user information stored in the storage unit and user information inputted by the user.

3. The information processing apparatus according to claim 1, wherein, in the authentication of the user, the at least one processor executes the instructions to transmit user information inputted by the user to a server for authentication, and authenticate the user based on authentication in the server.

4. The information processing apparatus according to claim 1, wherein, in the shift, the at least one processor executes the instructions to cause a screen including a button for causing a Wi-Fi Direct function to activate to be displayed on a display unit, and cause wireless authentication information for a Wi-Fi Direct connection from the mobile terminal to be displayed on the display unit in a case where an instruction is made with respect to the button by the user.

5. The information processing apparatus according to claim 1, wherein, in a case that it is determined that the authenticated user is logged in to the information processing apparatus, the at least one processor executes the instructions to cause a display unit to display a screen for allowing a user to instruct whether or not to permit a Wi-Fi Direct connection, in the start of the processing for establishing the Wi-Fi Direct communication with the mobile terminal, in accordance with the Wi-Fi Direct connection request from the mobile terminal.

6. The information processing apparatus according to claim 1, wherein the saved information related to the Wi-Fi Direct connection request received from the mobile terminal is used to display information related to the Wi-Fi Direct connection after the user has logged in to the information processing apparatus.

7. The information processing apparatus according to claim 1, wherein the at least one processor executes the instructions to further set, with respect to a user, authority information indicating whether or not to permit a wireless LAN connection with the mobile terminal,
 wherein, in a case that at least it is determined that the authenticated user is logged in to the information processing apparatus and authority information of the user permits a wireless LAN connection with the mobile terminal, the at least one processor executes the instructions to start the processing for establishing the Wi-Fi Direct communication with the mobile terminal based on the Wi-Fi Direct connection request received from the mobile terminal.

8. The information processing apparatus according to claim 1, wherein the at least one processor executes the instructions to further save, in a case where it is determined that the authenticated user is logged in to the information processing apparatus and authority information of the user does not permit a wireless LAN connection with the mobile terminal, information related to the Wi-Fi Direct connection request received from the mobile terminal.

9. A method of controlling an information processing apparatus operable to make a wireless LAN connection with a mobile terminal, the method comprising:
 authenticating a user;
 causing the information processing apparatus to shift to a state in which a Wi-Fi Direct connection request is able to be accepted from the mobile terminal;
 determining whether or not an authenticated user is logged in to the information processing apparatus in a case that the Wi-Fi Direct connection request is received from the mobile terminal in the state where the Wi-Fi Direct connection request is able to be accepted;
 starting processing for establishing Wi-Fi Direct communication with the mobile terminal based on the Wi-Fi Direct connection request received from the mobile terminal in a case that at least it is determined that the authenticated user is logged in to the information processing apparatus; and
 saving, in a case that it is determined in the determining that the authenticated user is not logged in to the information processing apparatus, information related to the Wi-Fi Direct connection request received from the mobile terminal.

10. A non-transitory computer-readable storage medium storing a program for causing a processor to execute a method of controlling an information processing apparatus operable to make a wireless LAN connection with a mobile terminal, the method comprising:
 authenticating a user;
 causing the information processing apparatus to shift to a state in which a Wi-Fi Direct connection request is able to be accepted from the mobile terminal;
 determining whether or not an authenticated user is logged in to the information processing apparatus in a case that the Wi-Fi Direct connection request is received from the mobile terminal in the state where the Wi-Fi Direct connection request is able to be accepted;
 starting processing for establishing Wi-Fi Direct communication with the mobile terminal based on the Wi-Fi Direct connection request received from the mobile terminal in a case that it is determined that the authenticated user is logged in to the information processing apparatus; and
 saving, in a case that it is determined in the determining that the authenticated user is not logged in to the information processing apparatus, information related to the Wi-Fi Direct connection request received from the mobile terminal.

\* \* \* \* \*